United States Patent
Zhu

(10) Patent No.: US 12,407,290 B2
(45) Date of Patent: Sep. 2, 2025

(54) METHOD OF DRIVING A MULTI-PHASE PERMANENT MAGNET ROTOR MOTOR

(71) Applicant: KINETIC TECHNOLOGIES INTERNATIONAL HOLDINGS LP, Toronto (CA)

(72) Inventor: Feng Zhu, Wanchai (HK)

(73) Assignee: Kinetic Technologies International Holdings LP, Toronto (CA)

( * ) Notice: Subject to any disclaimer, the term of this patent is extended or adjusted under 35 U.S.C. 154(b) by 174 days.

(21) Appl. No.: 18/206,570

(22) Filed: Jun. 6, 2023

(65) Prior Publication Data

US 2024/0413779 A1  Dec. 12, 2024

(51) Int. Cl.
*H02M 7/5395* (2006.01)
*H02P 21/09* (2016.01)
*H02P 21/22* (2016.01)
*H02P 27/08* (2006.01)

(52) U.S. Cl.
CPC ............ *H02P 27/085* (2013.01); *H02P 21/09* (2016.02); *H02P 21/22* (2016.02)

(58) Field of Classification Search
CPC .... H02M 7/5395; B60L 53/22; H02P 27/085; H02P 21/09; H02P 21/22
See application file for complete search history.

(56) References Cited

U.S. PATENT DOCUMENTS

| | | | |
|---|---|---|---|
| 2007/0030705 A1* | 2/2007 | Yamamoto | H02M 7/5395 363/41 |
| 2020/0189409 A1* | 6/2020 | Lee | B60L 53/22 |

OTHER PUBLICATIONS

"Sensorless PMSM Field-Oriented Control," Freescale Semiconductor, Document No. DRM148, 2016.
Jorge Zambada, "Sensorless Field Oriented Control of PMSM Motors", Microchip Technology Inc., AN1078, 2007, pp. 1-30.
Wei Xu et al., "Improved Rotor Flux Observer for Sensorless Control of PMSM with Adaptive Harmonic Elimination and Phase Compensation," CES Transactions on Electrical Machines and Systems, vol. 3, No. 2, Jun. 2019, pp. 151-159.

* cited by examiner

*Primary Examiner* — Cortez M Cook
(74) *Attorney, Agent, or Firm* — Sheppard Mullin Richter & Hampton LLP

(57) ABSTRACT

A method of driving a multi-phase permanent magnet rotor motor having a plurality of phase coils. The method comprises outputting pulse modulated control signals to the respective phase coils to bring the motor to a constant mode of operation. Once the motor is in its constant mode of operation, the method includes measuring phase coil currents and, for a selected phase coil, adjusting values of multi-phase stationary reference frame voltages for only remaining phase coils by one or more predetermined increments until the phase coil currents of the remaining phase coils equals the phase coil current of the selected phase coil or until the phase coil currents of the remaining phase coils fall with a predetermined range with respect to the phase coil current of the selected phase coil.

18 Claims, 12 Drawing Sheets

PRIOR ART

METHOD OF DRIVING A MULTI-PHASE PERMANENT MAGNET ROTOR MOTOR

FIELD OF THE INVENTION

The invention relates to a method of driving a multi-phase permanent magnet rotor motor. The invention relates particularly, but not inclusively, to a permanent magnet synchronous motor (PMSM) and to a method of adjusting or balancing motor control voltages.

BACKGROUND OF THE INVENTION

The most common types of multi-phase, e.g., three-phase, motors are synchronous motors and induction motors. When three-phase electric conductors are placed in certain geometrical positions, which means at a certain angle from one another, an electrical field is generated. The rotating magnetic field rotates at a certain speed known as synchronous speed. If a permanent magnet or electromagnet is present in this rotating magnetic field, the magnet is magnetically locked with the rotating magnetic field and consequently rotates at the same speed as the rotating field which results in a synchronous motor, as the speed of the rotor of the motor is the same as the speed of the rotating magnetic field.

A permanent magnet motor uses permanent magnets in the rotor to provide a constant magnetic flux which typically has a sinusoidal back-electromotive force (emf) signal. The rotor locks in when the speed of the rotating magnetic field in the stator is at or near synchronous speed. The stator carries windings which are connected to a controller having a power stage including a voltage supply, typically an alternating current (AC) voltage supply, to produce the rotating magnetic field. Such an arrangement constitutes a PMSM.

PMSMs are similar to brushless direct current (BLDC) motors and to brushed direct current (BDC) motors. BLDC motors can be considered as synchronous DC motors which use a controller having a power stage including a DC voltage supply, suitably converted, to produce the stator rotating magnetic field. BLDC motors therefore use the same or similar control algorithms as AC synchronous motors, especially PMSM motors.

Problems arise with known multi-phase permanent magnet rotor motors in that it is typically assumed that all of the phase coils, i.e., the stator coils, are identical having the same values of resistance and inductance. Consequently, the stator coils are typically driven using the same amplitudes of motor control voltages applied with suitable phase differences. Typically, only one stator coil is considered when determining the amplitudes of the motor control voltages. However, the assumption that all of the coils are identical is not always the case as differences in coil parameters such as resistance and inductance may result from imperfect coil manufacturing techniques or differences in parameter values may result from wear or deterioration during prolonged motor operation. For example, during manufacture, different resistances of coils may result from the coil wire being unintentionally stretched during coil winding, or variations in the thickness of the enameled layer over the length of the coil wire, or variations in the lead-out lengths between coils. Other problems may arise due to asymmetries in the laminations of the stators. The result of such differences may be imbalances in operating or physical parameters between the coils especially when being driven. This may lead to one or more disadvantages including a loss of efficiency in the operation of the motor.

Among other things, what is therefore desired is an improved method of driving a permanent magnet rotor motor and/or adjusting and/or balancing phase (stator) coil torques for the permanent magnet rotor motor to reduce or eliminate imbalances in torque between the stator coils.

OBJECTS OF THE INVENTION

An object of the invention is to mitigate or obviate to some degree one or more problems associated with known methods of controlling a multi-phase permanent magnet rotor motor.

The above object is met by the combination of features of the main claims; the sub-claims disclose further advantageous embodiments of the invention.

Another object of the invention is to provide an improved method of adjusting motor control voltages for a permanent magnet rotor motor to reduce or eliminate imbalances in torque between the stator coils.

A further object of the invention is to provide an improved method of adjusting stator currents and/or motor control voltages for a permanent magnet rotor motor to reduce or eliminate imbalances in torque between the stator coils.

One skilled in the art will derive from the following description other objects of the invention. Therefore, the foregoing statements of object are not exhaustive and serve merely to illustrate some of the many objects of the present invention.

SUMMARY OF THE INVENTION

The invention concerns a method of driving a multi-phase permanent magnet rotor motor having a plurality of phase coils. The method comprises outputting pulse modulated control signals to the respective phase coils to bring the motor to a constant mode of operation. Once the motor is in its constant mode of operation, the method includes measuring phase coil currents and, for a selected phase coil, adjusting values of multi-phase stationary reference frame voltages for only remaining phase coils preferably by one or more predetermined increments until the phase coil currents of the remaining phase coils equals the phase coil current of the selected phase coil or until the phase coil currents of the remaining phase coils fall with a predetermined range with respect to the phase coil current of the selected phase coil.

In a first main aspect, the invention provides a method of driving a multi-phase permanent magnet rotor motor having a plurality of phase coils, the method comprising the steps of: outputting pulse modulated control signals to the respective phase coils to bring the motor to a constant mode of operation; measuring phase coil currents; and based on a selected phase coil, adjusting values of multi-phase stationary reference frame voltages comprising said pulse modulated control signals for remaining phase coils not including said selected phase coil until the phase coil currents of the remaining phase coils equals the phase coil current of the selected phase coil or until the phase coil currents of the remaining phase coils fall with a predetermined range with respect to the phase coil current of the selected phase coil.

In a second main aspect, the invention provides a three-phase permanent magnet rotor motor comprising a plurality of phase coil windings and a controller configured to implement the method of the first main aspect of the invention.

In a third main aspect, the invention provides a controller for a multi-phase permanent magnet rotor motor comprising a plurality of phase coil windings, the controller being configured to implement the method of the first main aspect of the invention.

The summary of the invention does not necessarily disclose all the features essential for defining the invention; the invention may reside in a sub-combination of the disclosed features.

The forgoing has outlined fairly broadly the features of the present invention in order that the detailed description of the invention which follows may be better understood. Additional features and advantages of the invention will be described hereinafter which form the subject of the claims of the invention. It will be appreciated by those skilled in the art that the conception and specific embodiment disclosed may be readily utilized as a basis for modifying or designing other structures for carrying out the same purposes of the invention.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
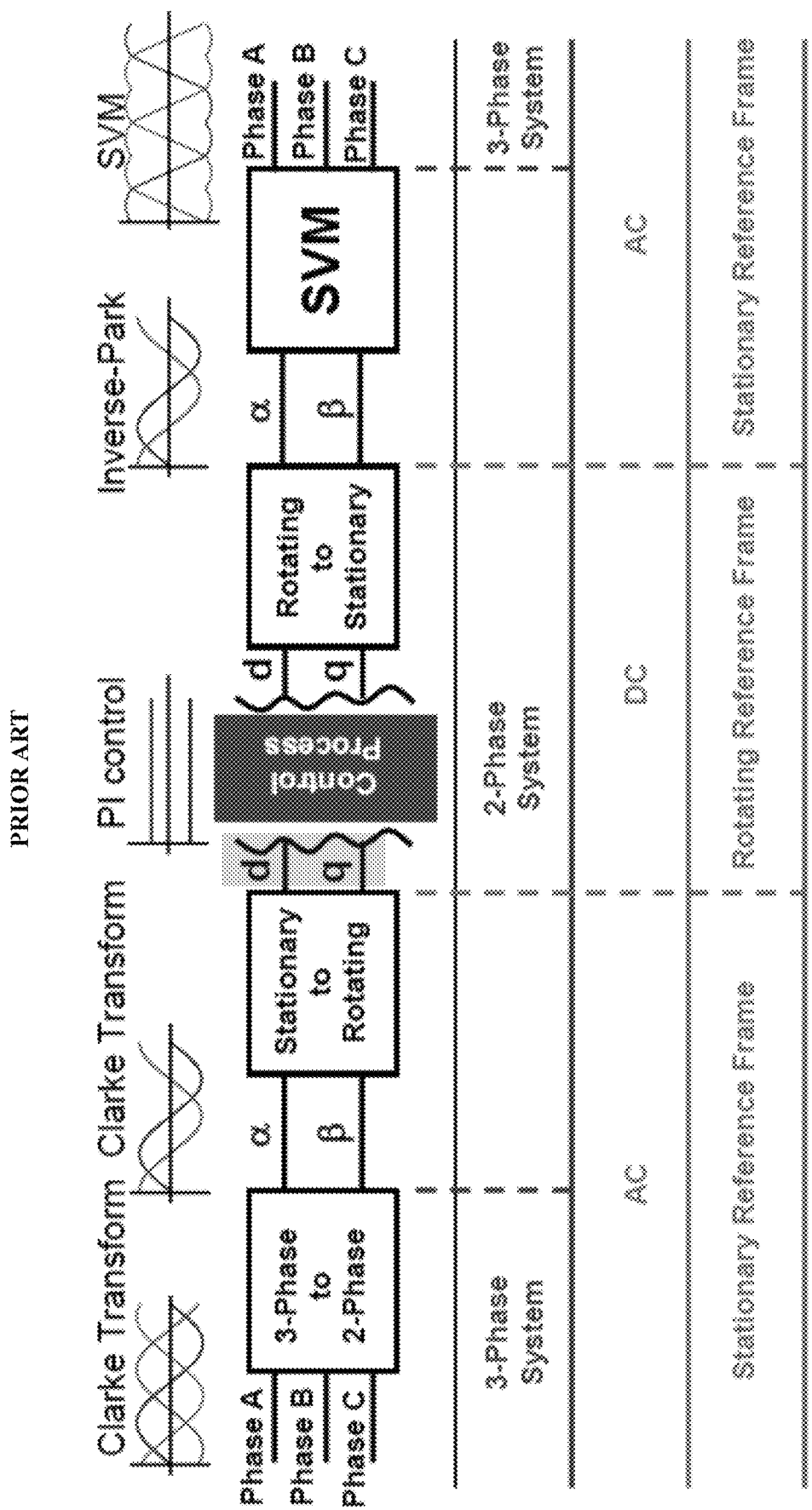
FIG. 1 is a block schematic diagram of a known sensorless field-oriented control (FOC) system to drive connected phase coil windings of a three-phase, three-wire permanent magnet rotor motor.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the Figs. may be implemented in various forms of hardware, software, or combinations thereof. These elements may be implemented in a combination of hardware and software on one or more appropriately programmed general-purpose devices, which may include a processor, a memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode, or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

In the following description, references to any of "coil", "winding", "coil winding", "phase coil", "phase coil winding", "stator coil", and "stator winding" will be taken to mean one and the same thing, e.g., "stator coil".

Referring to the drawings, FIG. 1 comprises a schematic block diagram taken from the publication entitled "Sensorless PMSM Field-Oriented Control", the content of which is incorporated herein by reference. FIG. 1 illustrates a known sensorless field-oriented control (FOC) system to drive the connected phase coil windings of a three-phase, three-wire permanent magnet rotor motor.

Figure 2:
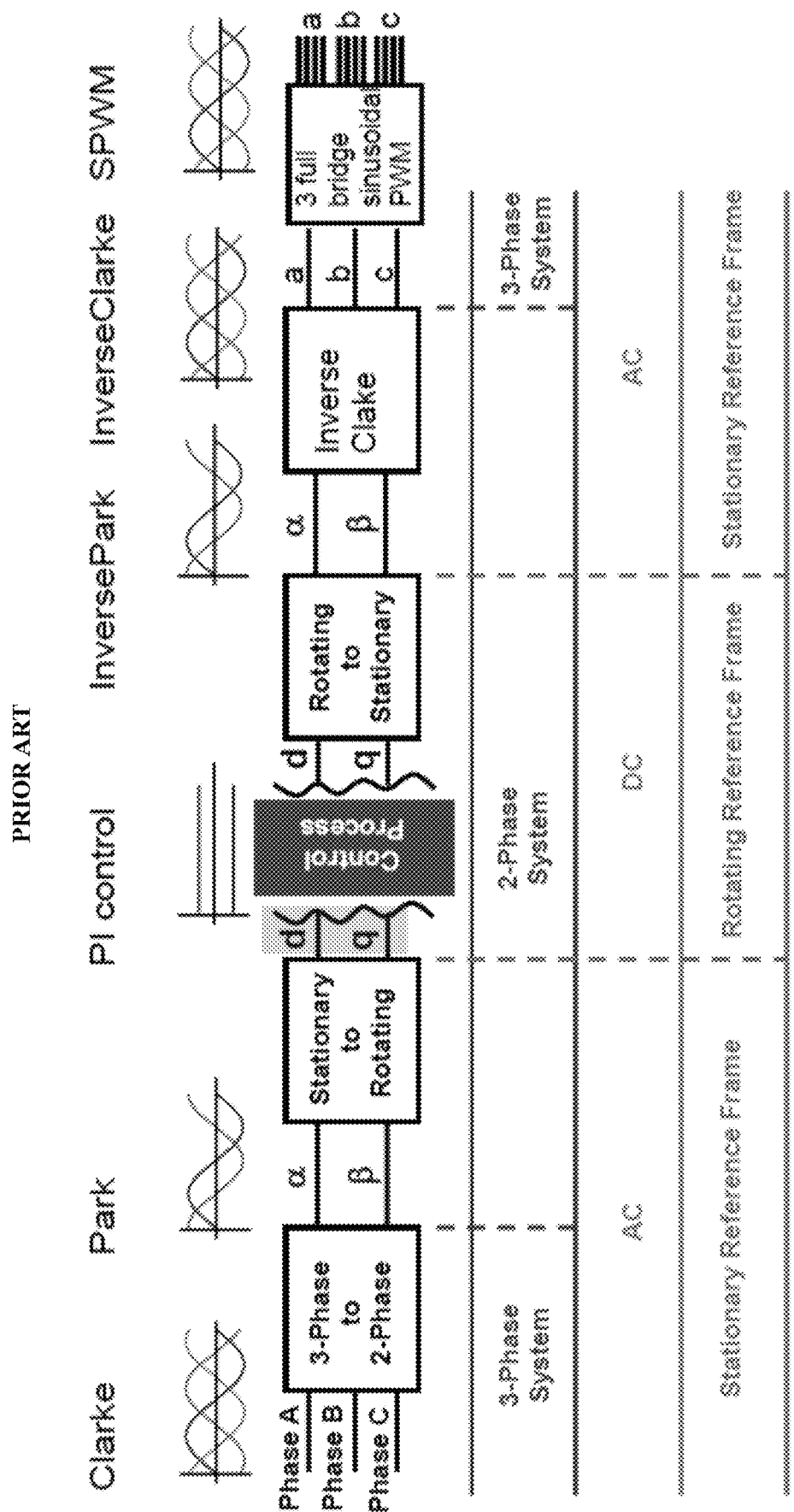
FIG. 2 is a block schematic diagram of a known sensorless FOC system to drive separated phase coil windings of a three-phase, six-wire permanent magnet rotor motor.

By way of contrast, FIG. 2, taken from of the same publication, comprises a schematic block diagram illustrating the known concept of sensorless FOC of multi-phase separated windings with full-bridge inverters to drive the separated phase coil windings of the permanent magnet rotor motor. In FIG. 2, the motor comprises three phases but with three separated, i.e., independent, phase coil windings and three full-bridge inverters to drive the separated windings.

Figure 3:
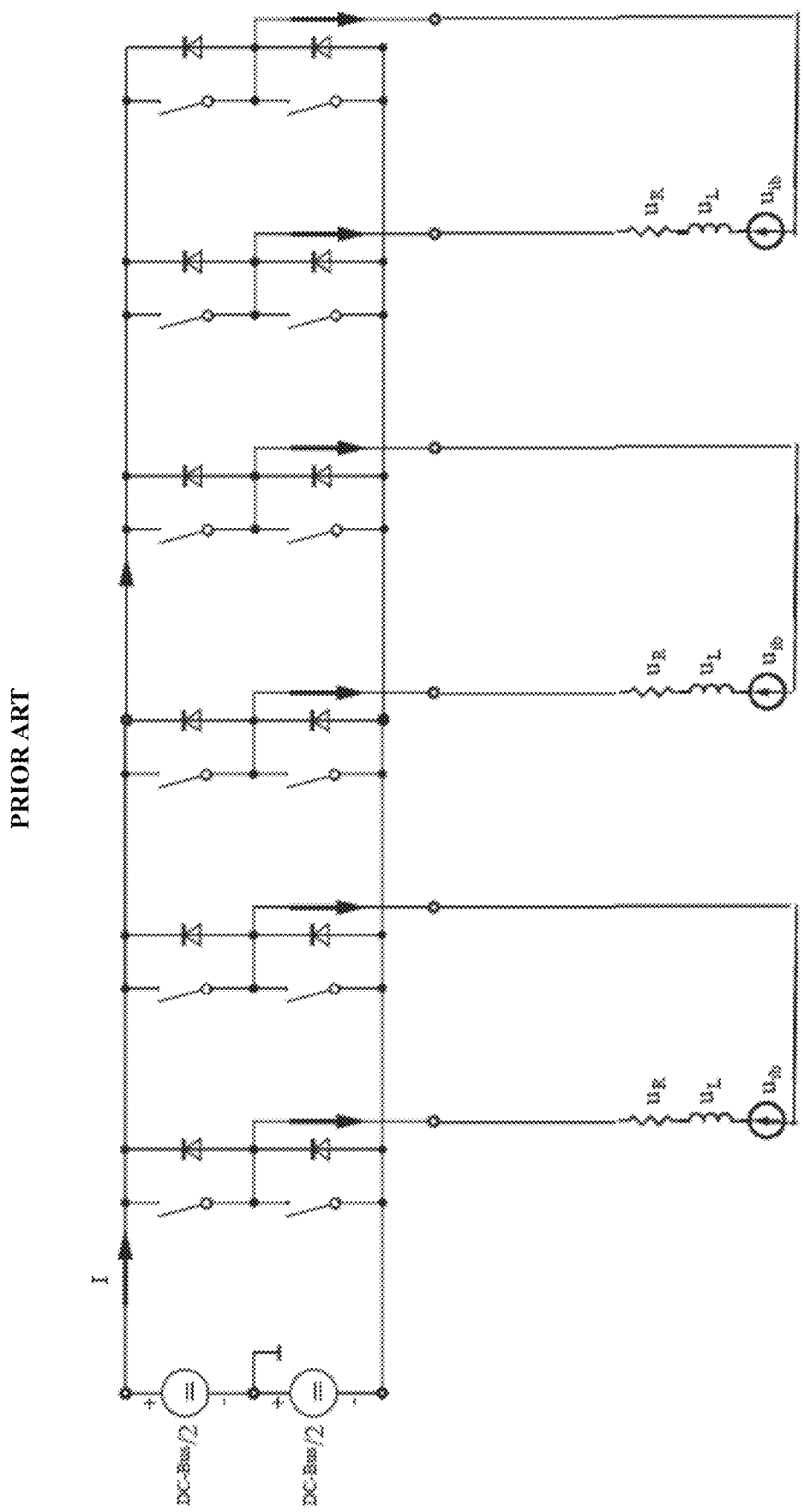
FIG. 3 is a block schematic diagram of a full-bridge inverter circuit for the known FOC system of FIG. 2.

FIG. 3 comprises a schematic diagram from the same publication of the three full-bridge inverters used to drive the three-phase separated windings. After the inverse-Clark transform (FIG. 2), the sinusoidal three phase voltages are mapped into switching on times for each of the three full-bridge inverters to give the positive and negative voltages to drive the separated motor windings.

Figure 4:
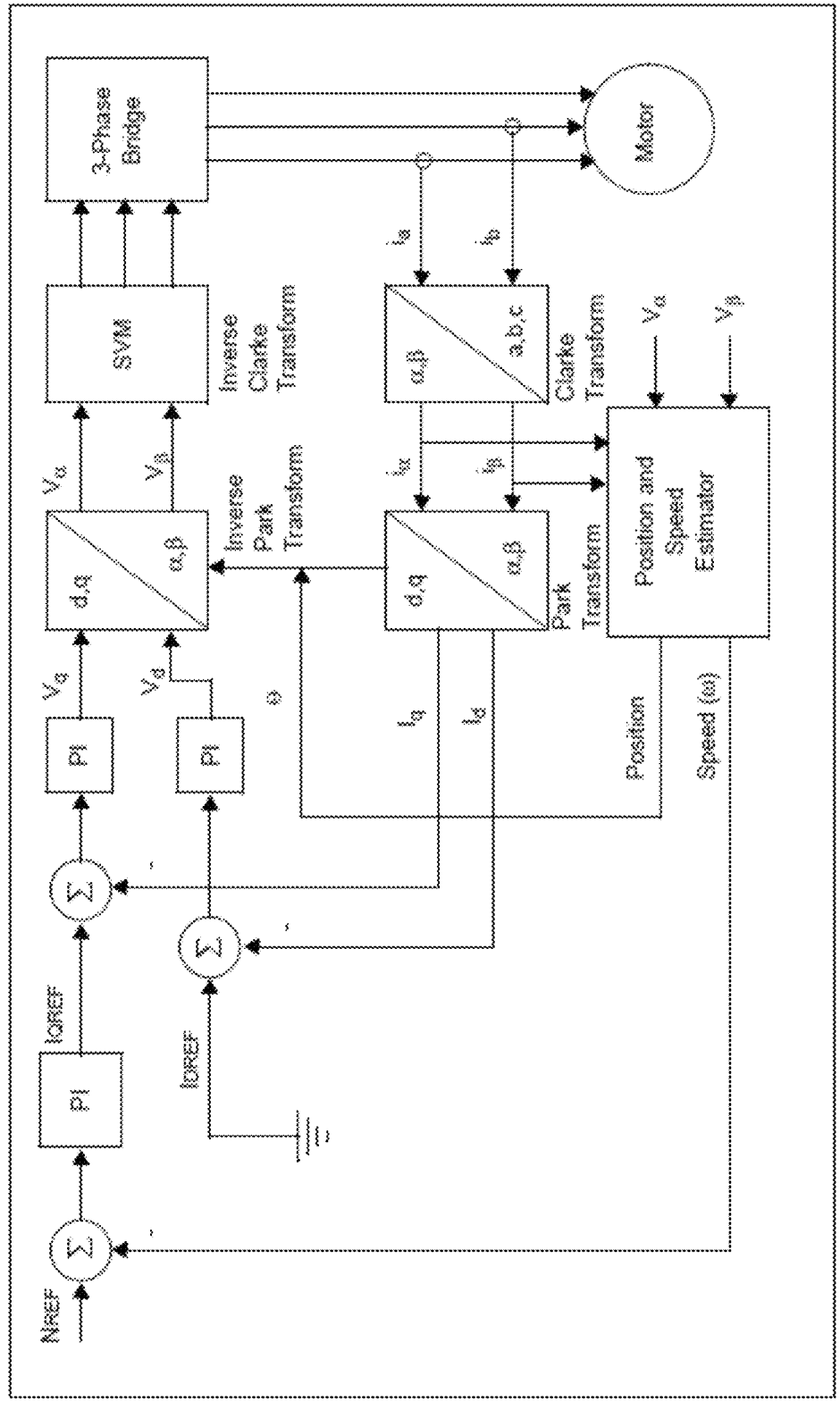
FIG. 4 is a detailed schematic block diagram of the known FOC system of FIG. 2.

FIG. 4 comprises a known vector control block diagram comprising a controller suitable for controlling the three-phase separated winding motor associated with FIGS. 2 and 3. This vector control block diagram is described in the publication entitled "Sensorless Field Oriented Control of PMSM Motors" authored by Jorge Zambada, published by Microchip Technology Inc. in 2007 as paper AN1078, the content of which is also incorporated herein by way of reference.

Vector control of a synchronous motor can be summarized as follows:
(i) The 3-phase stator currents are measured. These measurements typically provide values for only $i_a$ and $i_b$, $i_c$ can be calculated because $i_a$, $i_b$ and $i_c$ have the following relationship:

$$i_a + i_b + i_c = 0.$$

(ii) The 3-phase currents are converted to a two-axis stationary reference frame system. This conversion provides the variables $i_\alpha$ and $i_\beta$ from the measured $i_a$ and $i_b$ and the calculated $i_c$ values. $i_\alpha$ and $i_\beta$ are time-varying quadrature current values as viewed from the perspective of the stator, i.e., a two-dimensional stationary orthogonal reference frame or coordinate system.

(iii) The two-axis coordinate system is rotated to align with the rotor flux using a transformation angle θ calculated at the last iteration of the control loop. This conversion provides the $I_{da}$ and $I_q$ variables from $i_\alpha$ and $i_\beta$. $I_d$ and $I_q$ are the quadrature currents transformed to the two-axis rotating (reference frame) coordinate system, a two-axis or two-dimensional rotating orthogonal reference frame or coordinate system. For steady state motor operating conditions, $I_d$ and $I_q$ are constant.

(iv) Error signals are formed using $I_d$, $I_q$ and reference values for each.
 The $I_d$ reference controls rotor magnetizing flux.
 The $I_q$ reference controls the torque output of the motor.
 The error signals are input to PI controllers.
 The output of the controllers provide $V_d$ and $V_q$, which is a voltage vector that will be sent to the motor.

(v) A new transformation angle θ is estimated where $v_\alpha$, $v_\beta$, $i_\alpha$ and $i_\beta$ are the inputs. The new angle guides the FOC algorithm as to where to place the next voltage vector.

(vi) The $V_d$ and $V_q$ output values from the PI controllers are rotated back to the two-axis stationary reference frame using the new value of angle θ. This calculation provides the next quadrature voltage values $v_\alpha$ and $v_\beta$.

(vii) The $v_\alpha$ and $v_\beta$ values are transformed back to 3-phase values $v_a$, $v_b$ and $v_c$. The 3-phase voltage values are used to calculate new PWM duty cycle values that generate the desired voltage vector. The entire process of transforming, PI iteration, transforming back and generating PWM is schematically illustrated in FIGS. 1, 2 and 4.

Figure 5:
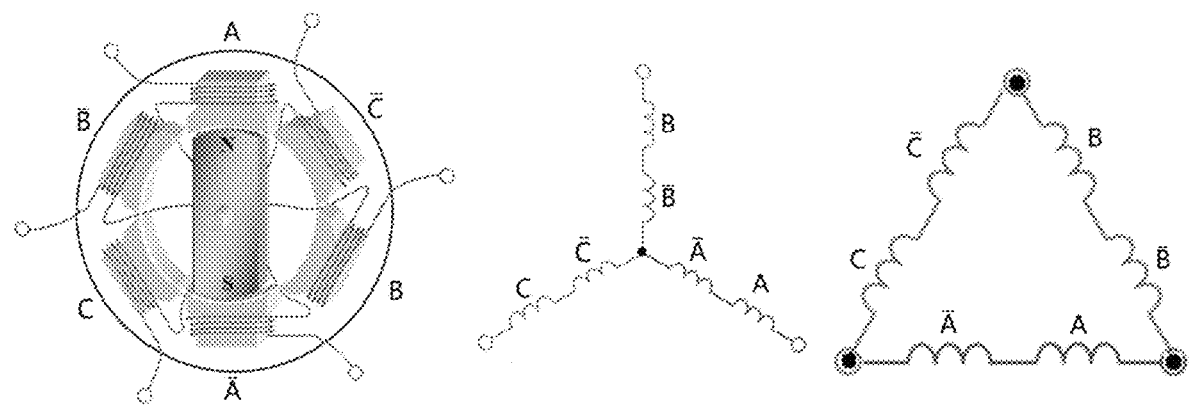
FIG. 5 is a schematic diagram showing the delta and star (or Y) phase coil winding configurations of a three-phase, three-wire permanent magnet rotor motor in which the motor operating method in accordance with the invention can be implemented.

FIG. 5 is a schematic diagram showing the delta and star (or Y) phase coil (stator) winding configurations of an embodiment of a three-phase, three-wire permanent magnet rotor motor of a type controllable by the FOC system of FIG. 1. It will be seen that, for the star configuration of the three phase coil windings, the three phase coil windings share a common central connection point, i.e., the phase coil windings do not each have two free ends and are not each independent of one another. Similarly, for the delta configuration of the three phase coil windings, the adjacent pairs of the three phase coil windings are connected such that the adjacent pairs of windings each share a respective common connection point, i.e., the phase coil windings do not each have two free ends and are not each independent of one another.

Figure 6:
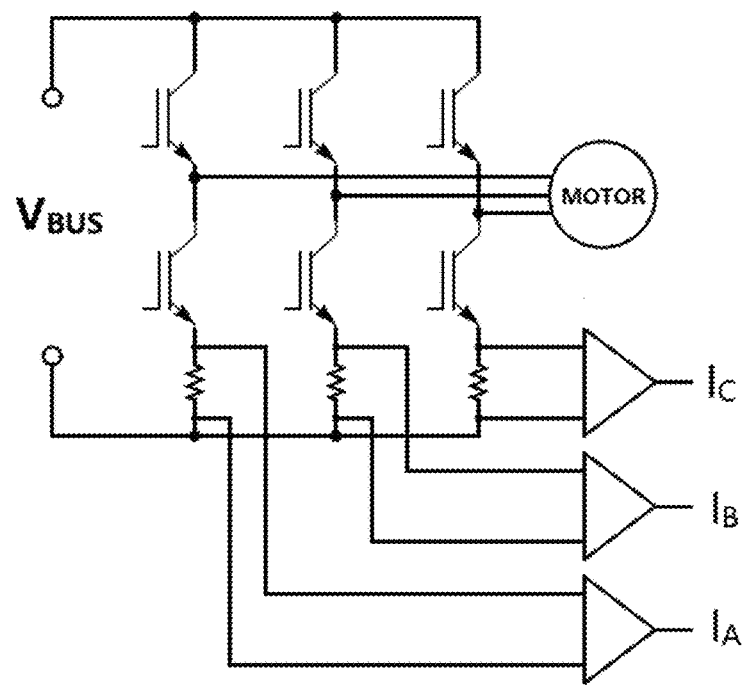
FIG. 6 is a schematic block diagram of a half-bridge inverter circuit for the FOC system for the three-phase, three-wire permanent magnet rotor motor of FIG. 5.

FIG. 6 is a schematic block diagram of the bridge inverter circuit for a motor control system for the motor of FIG. 5. It will be seen that the bridge inverters only comprise half-bridge inverters, not full-bridge inverters. Whilst FIG. 6 shows three output currents denoted as "$I_A$", "$I_B$" and "$I_C$" from the half-bridge inverters, only two output currents may be required to be fed to the FOC system. This is because the phase coil windings are not independent and thus only two of the outputted currents may be necessary to derive the third outputted current. Typically, the sensed currents "$I_A$" ("$i_a$"), "$I_B$" ("$i_b$") are selected.

Figure 7:
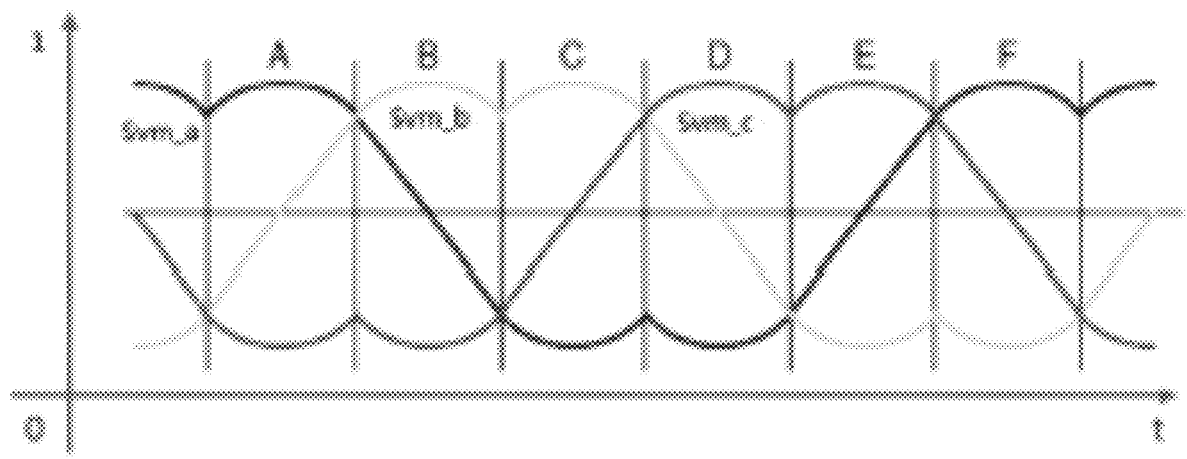
FIG. 7 shows the SVM control waveforms for the three-phase, three-wire permanent magnet rotor motor of FIG. 5.

FIG. 7 shows the SVM control waveforms for the three-phase, three-wire permanent magnet rotor motor of FIG. 5.

Figure 8:
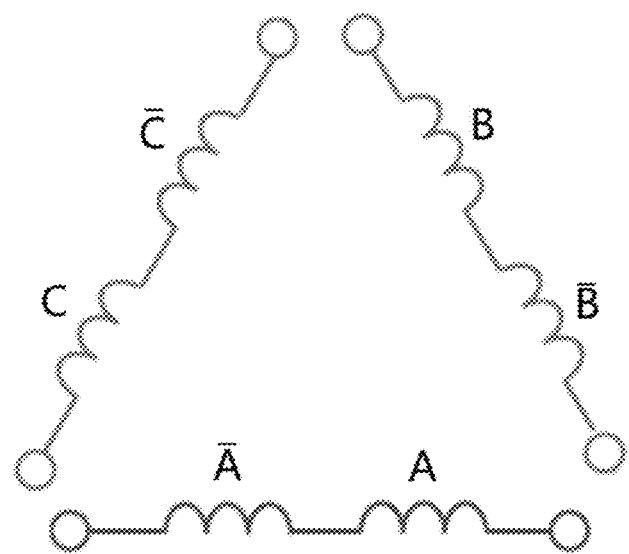
FIG. 8 is a schematic diagram showing a six-wire configuration of phase coil windings of a three-phase separated windings motor in which the motor operating method in accordance with the invention can be implemented.
Figure 9:
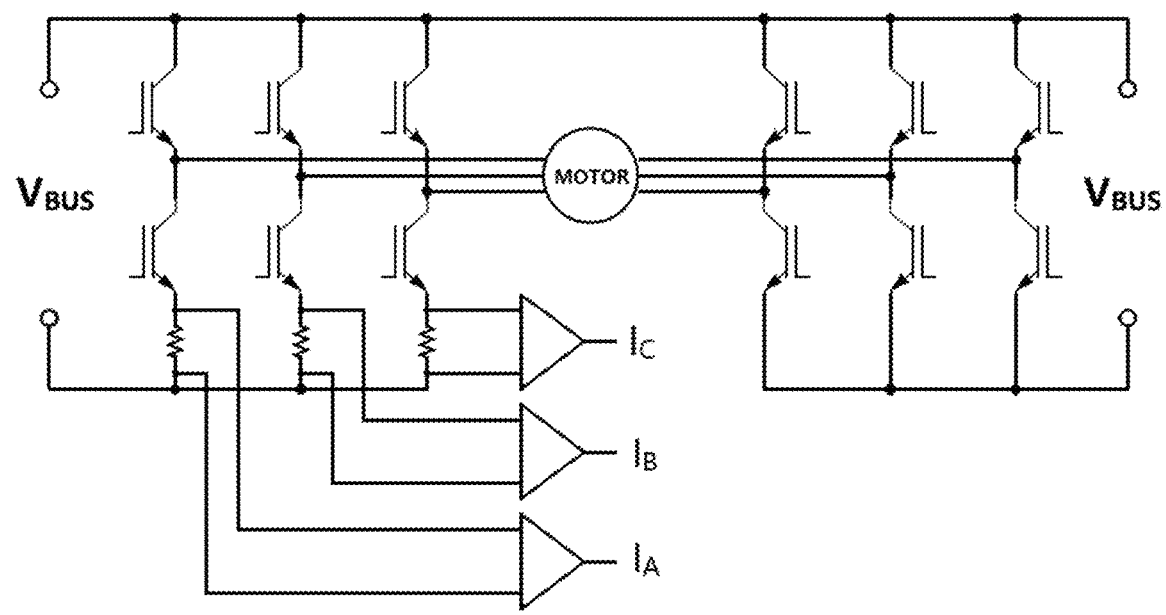
FIG. 9 is a schematic block diagram of a full-bridge inverter circuit for the motor control system in accordance with the invention for the three-phase, six-wire separated windings motor of FIG. 8.

In contrast to FIG. 5, FIG. 8 provides a schematic diagram showing a six-wire configuration of the phase coil windings of a multi-phase motor in accordance with the invention whilst FIG. 9 provides a schematic block diagram of a full-bridge inverter circuit for a motor controller for said motor. The six-wire phase coil winding configuration results from the fact that none of the three phase coil windings having any common connection points in contrast to the conventional delta or star stator winding configurations of FIG. 5 which have at least one common connection point between at least two of the phase coil windings.

Figure 10:
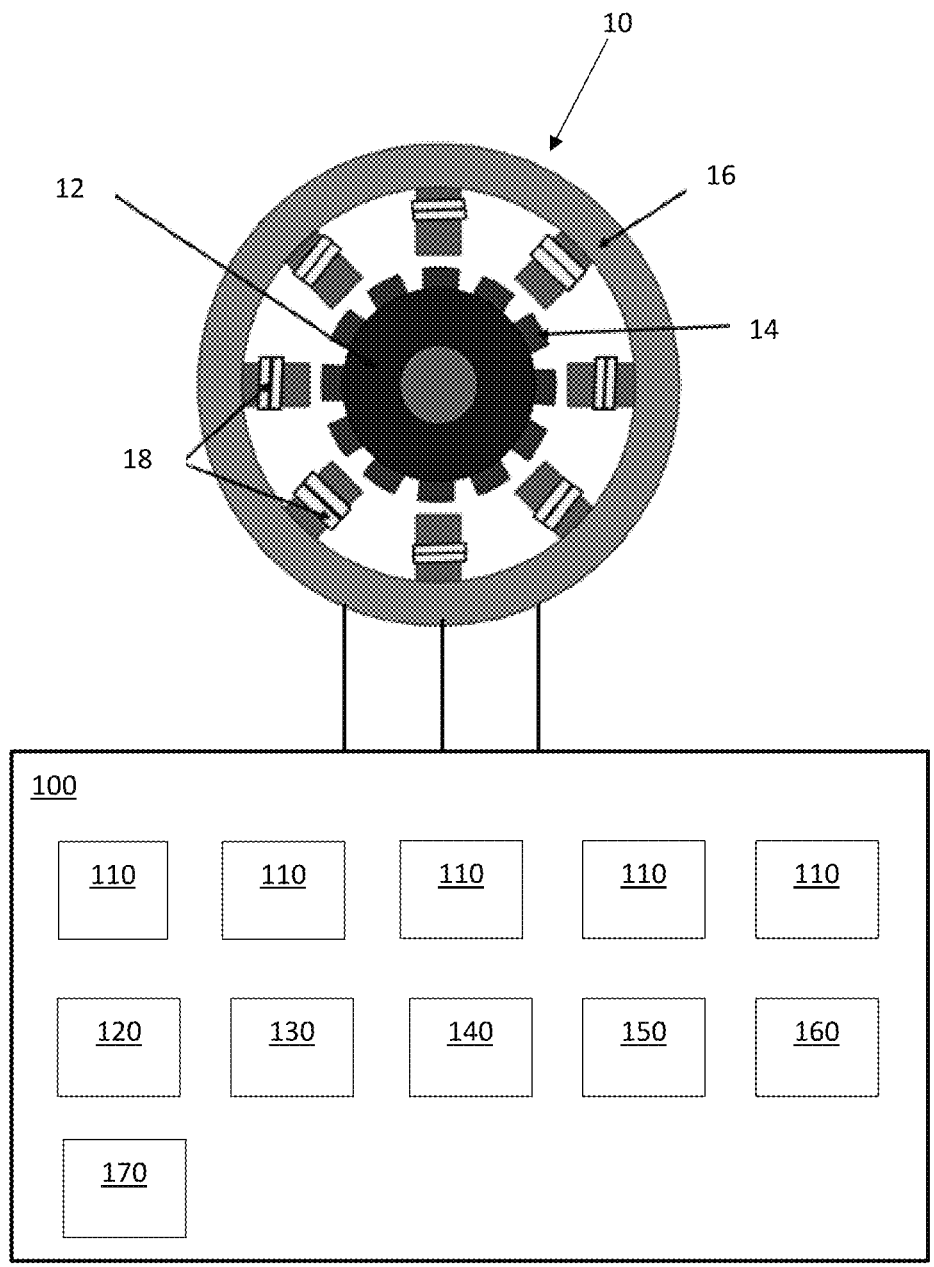
FIG. 10 is a schematic diagram showing the delta and star (or Y) stator windings configurations of a multi-phase separated windings motor in which the motor operating method in accordance with the invention can be implemented.

FIG. 10 shows an exemplary embodiment of an improved motor controller 100 for a multiphase separated windings motor 10 in accordance with concepts of the present invention. The multiphase separated windings motor 10 has a permanent magnet rotor 12 with a plurality of permanent magnets 14 and a stator 16 with a plurality of phase coil (stator) windings 18. Whilst the multiphase separated windings motor 10 is shown with the stator 16 surrounding the rotor 12 in a known manner, it will be understood that the concepts of the present invention are equally applicable to a synchronous motor where the rotor surrounds the stator, i.e., the stator is arranged internally of the rotor.

In the illustrated embodiment, the motor controller 100 may comprise a plurality of functional blocks 110 for performing various functions thereof. For example, the motor controller 100 may comprise a suitably modified or suitably configured known vector-based closed-loop controller such as a direct torque control (DTC) closed-loop controller or a Field Oriented Control (FOC) closed-loop controller as described, for example, in "Sensorless Field Oriented Control of PMSM Motors" of paper AN1078 and as illustrated in FIG. 11 herein but modified as described below in accordance with the concepts of the invention.

The motor controller 100 may, for example, be implemented using logic circuits and/or executable code/machine readable instructions stored in a memory for execution by a processor 120 to thereby perform functions as described herein. For example, the executable code/machine readable instructions may be stored in one or more memories 130 (e.g., random access memory (RAM), read only memory (ROM), flash memory, magnetic memory, optical memory, or the like) suitable for storing one or more instruction sets (e.g., application software, firmware, operating system, applets, and/or the like), data (e.g., configuration parameters, operating parameters and/or thresholds, collected data, processed data, and/or the like), etc. The one or more memories 130 may comprise processor-readable memories for use with respect to one or more processors 120 operable to execute code segments of the closed-loop controller 100 and/or utilize data provided thereby to perform functions of the closed-loop controller 100 as described herein. Additionally, or alternatively, the closed-loop controller 100 may comprise one or more special purpose processors (e.g., application specific integrated circuit (ASIC), field programmable gate array (FPGA), graphics processing unit (GPU), and/or the like configured to perform functions of the closed-loop controller 100 as described herein.

Figure 11:
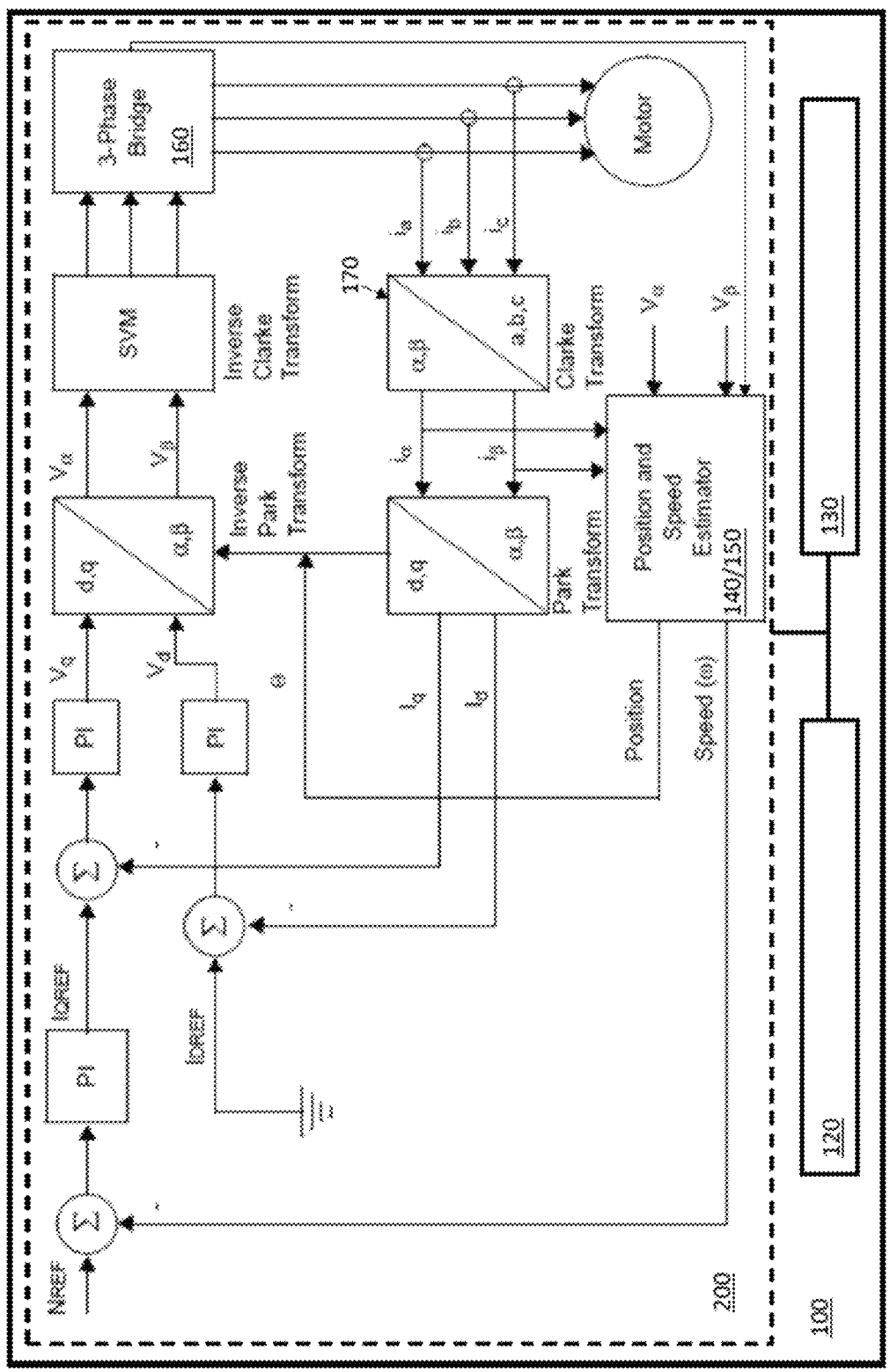
FIG. 11 detailed schematic block diagram of a motor control system in accordance with the invention.
Figure 12:
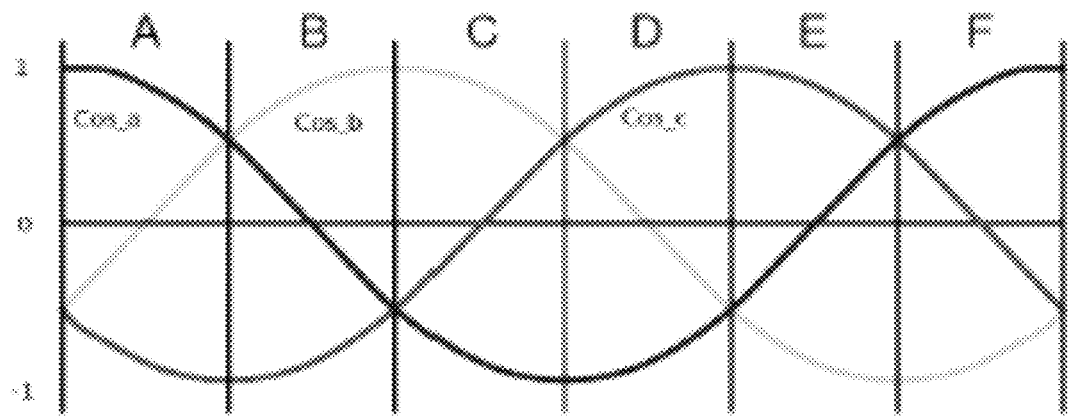
FIG. 12 shows the sinewave control waveforms for the three-phase, six-wire separated windings motor of FIG. 10.

In a broad aspect, the invention comprises using the motor controller 100 of FIGS. 10 and 11, e.g., using the modified FOC controller 200 of FIG. 11, to implement the motor operating procedure in accordance with the invention. The motor controller 100 may comprise any known, suitable closed-loop controller for synchronous operation and may comprise the FOC controller 200 as described in "Sensorless Field Oriented Control of PMSM Motors" of paper AN1078 or as described in the publication entitled "Sensorless PMSM Field-Oriented Control", the FOC controller 200 being suitably modified or reconfigured to implement the motor operating method of the invention. Two or more of the outputs of the 3-phase bridge module 160 of the motor controller 100/200 of FIG. 11 comprising two or more of the sensed currents denoted as "$I_A$", "$I_B$" and "$I_C$" in FIG. 9 are fed to the Clarke Transform module 170 of the motor controller 100/200 for processing. A further modification of the motor controller 200 compared to the conventional controller of FIG. 4 is that, in the motor controller of FIG. 11, preferably all of the 3-phase stator currents $i_a, i_b, i_c$ ("$I_A$", "$I_B$" and "$I_C$") are measured. This improves the efficiency of control of the motor 10.

The modified or reconfigured motor controller 100/200 of FIGS. 10 and 11 is arranged to operate the synchronous motor 10 having a permanent magnet rotor 12 and stator windings 18 by energizing the stator windings 18 using pulse width modulated (PWM) motor control signals.

To produce electromagnetic torque, in general, a rotor flux and a stator mmf (magnetomotive force) has to be present that are stationary with respect to each other but having a non-zero phase shift between them. In a PMSM, the necessary rotor flux is present due to the rotor permanent magnets. The stator currents in the stator windings generate the stator mmf. The revolving stator mmf is the result of injecting a set of polyphase currents phase shifted from each other by the same amount of phase shift between the polyphase windings. For example, a three-phase motor with three windings shifted in space electrically by 120° from each other and injected with currents shifted by the same amount of 120° produces a rotating magnetic field constant in magnitude.

Figure 13:
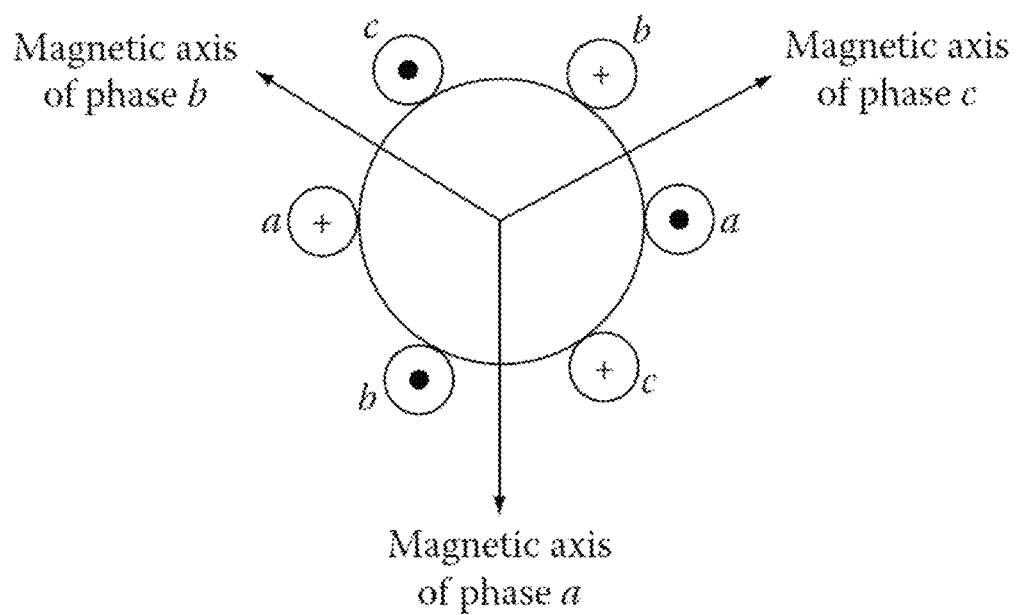
FIG. 13 is a magnetic field diagram for a three-phase permanent magnet rotor motor.

FIG. 13 provides a magnetic field diagram for a three-phase permanent magnet rotor motor showing the magnetic axis of each phase or coil.

A rotating magnetic field is produced in a motor with balanced three-phase windings over the space when it is injected with a balanced three-phase sinusoidal current. The three-phase currents are balanced in that they have equal peaks ($I_m$), an angular frequency $\omega_s$ and are shifted in phase from each other by 120° such that:

$$i_{as} = I_m \sin(\omega_s t)$$
$$i_{bs} = I_m \sin(\omega_s t + 120°)$$
$$i_{cs} = I_m \sin(\omega_s t + 240°)$$

Consequently, the individual phase mmfs corresponding to the spatial position $\theta$ are given by:

$$F_{as} = T_{ph} I_m \sin(\theta)\sin(\omega_s t)$$
$$F_{bs} = T_{ph} I_m \sin(\theta + 120°)\sin(\omega_s t + 120°)$$
$$F_{cs} = T_{ph} I_m \sin(\theta + 240°)\sin(\omega_s t + 240°)$$

where $T_{ph}$ is the effective number of turns in each phase.

The resultant stator mmf is given by the sum of the individual phase mmfs:

$$\begin{aligned} F_s &= F_{as} + F_{bs} + F_{cs} \\ &= T_{ph} I_m \sin(\theta)\sin(\omega_s t) + T_{ph} I_m \sin(\theta + 120°)\sin(\omega_s t + 120°) + \\ &\quad T_{ph} I_m \sin(\theta + 240°)\sin(\omega_s t + 240°) \\ &= 0.5 T_{ph} I_m [\cos(\theta - \omega_s t) + \cos(\theta + \omega_s t)] + \\ &\quad 0.5 T_{ph} I_m [\cos(\theta - \omega_s t) + \cos(\theta + \omega_s t - 120°)] + \\ &\quad 0.5 T_{ph} I_m [\cos(\theta - \omega_s t) + \cos(\theta + \omega_s t - 240°)] \\ &= 1.5 T_{ph} I_m [\cos(\theta - \omega_s t)] \end{aligned}$$

The resultant stator mmf has a constant magnitude but varies co-sinusoidally. It is maximum when the stator position and angular position of the current phasor coincides. The stator mmf moves by the same angle as the variation of stator phase current with phasor angle 90°. The magnetic field revolves or rotates at a speed equal to the angular frequency of the input currents.

Figure 14:
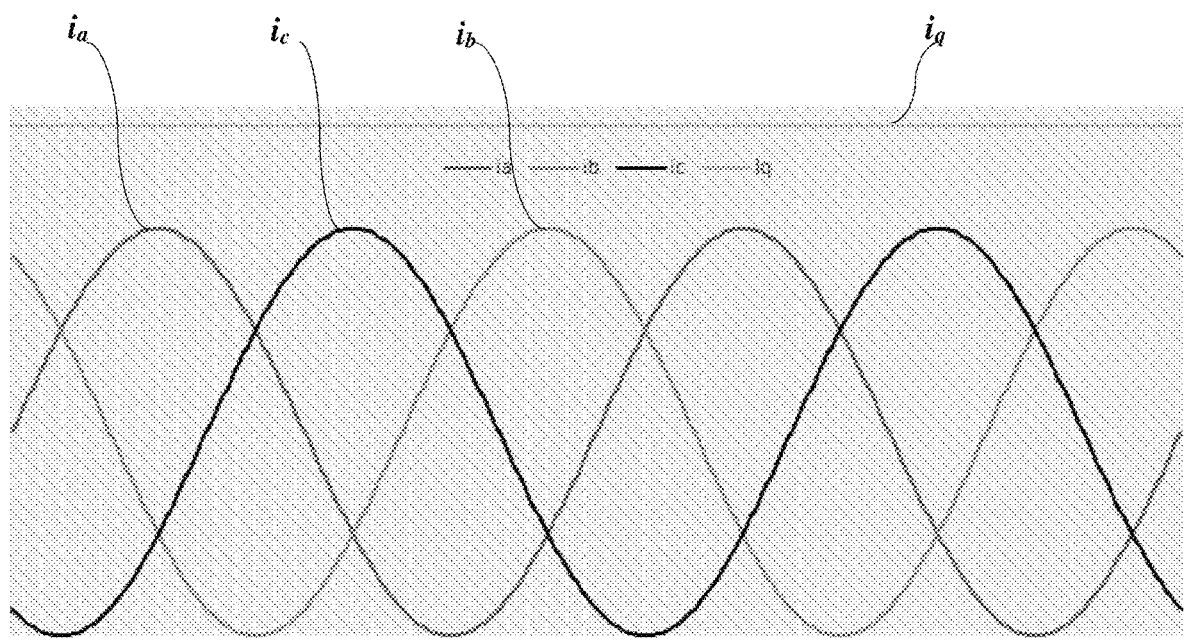
FIG. 14 shows the ideal stator current waveforms for a three-phase permanent magnet rotor motor.

FIG. 14 shows the ideal stator current waveforms for a three-phase permanent magnet rotor motor.

Figure 15:
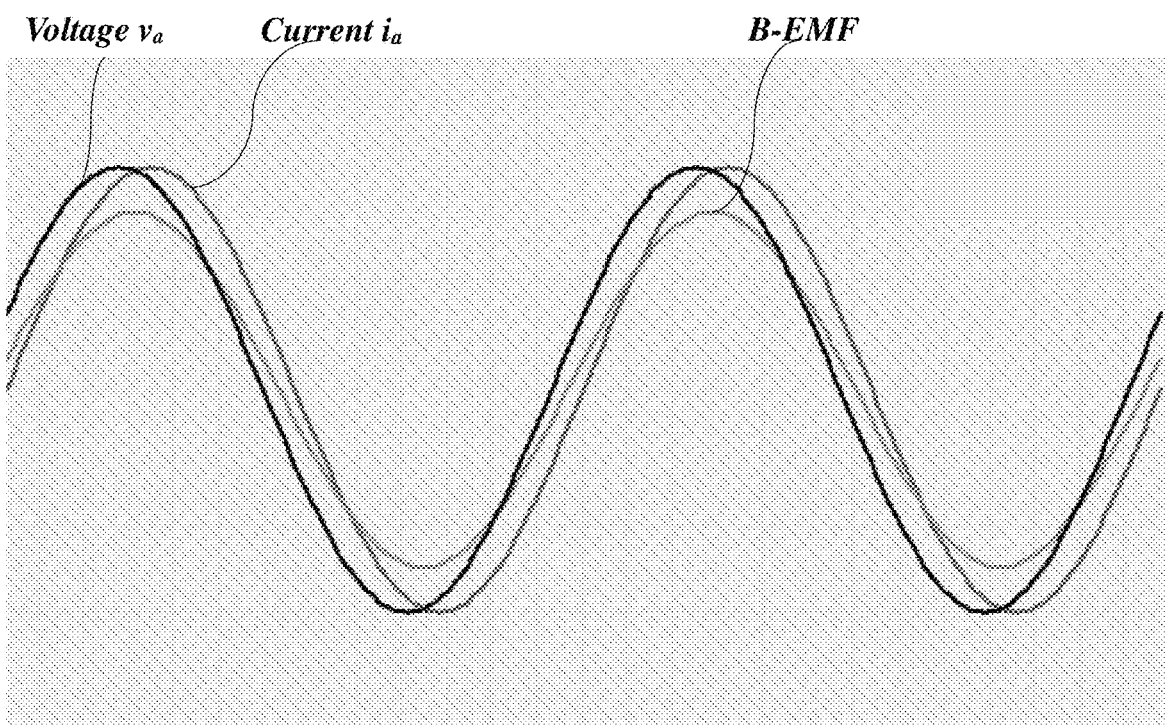
FIG. 15 shows the relationship between the stator current waveform, the corresponding back-emf waveform, and the three-phase stationary reference frame voltage waveform for stator coil A.

FIG. 15 illustrates the relationship between the stator current waveform $i_a$, the corresponding back-emf (B-EMF) waveform, and the three-phase stationary reference frame voltage waveform $v_a$ for stator coil A. It will be seen that the current waveform $i_a$ and the corresponding back-emf waveform lag behind the three-phase stationary reference frame voltage waveform $v_a$ for stator coil A.

Taking the six-wire, three phase motor winding configuration of FIG. 8, by way of example only, controlled by the modified FOC controller 200 of FIG. 11, the motor control method of the invention comprises outputting pulse modulated control (PWM) signals to the respective phase coils to bring the motor to a constant mode of operation. A constant mode of operation comprises the motor 10 being operated at a constant speed of rotor rotation regardless of the load torque. However, it is preferable that the load on the motor 10 is also maintained as constant as possible although this is not essential to the implementation of the motor control method of the invention. The method includes measuring the phase (stator) coil currents ($i_a$, $i_b$, $i_c$) and then, for a selected phase coil, e.g., coil A, adjusting values of the multi-phase stationary reference frame voltages ($v_b$, $v_c$) for remaining phase coils, e.g., coils B, C, by one or more predetermined increments until the measured phase coil currents $i_b$, $i_c$ of the remaining phase coils B, C equals the phase coil current $i_a$ of the selected phase coil A or until the phase coil currents $i_b$, $i_c$ of the remaining phase coils B, C fall with a predetermined range with respect to the phase coil current $i_a$ of the selected phase coil A. The predetermined range preferably extends by predetermined amounts above and below the phase coil current $i_a$ of the selected phase coil A. Preferably, the predetermined range preferably extends by the same predetermined amounts above and below the phase coil current $i_a$ of the selected phase coil A.

The phase coil currents $i_a$, $i_b$, $i_c$ are first measured once the motor 10 is determined to be operating at its constant mode of operation, but preferably first measurement of the phase coil currents $i_a$, $i_b$, $i_c$ is conducted at a predetermined time period after the motor 10 has been driven to the constant mode of operation. This is advantageous in that the motor 10 may appear to have reached its constant mode of operation, but that a variation of load on the motor 10 may cause fluctuations in the rotational speed of the rotor 12 which may require time to settle back to the constant mode of operation.

Preferably also, the steps of measuring the phase coil currents $i_a$, $i_b$, $i_c$ and adjusting the values of the multi-phase stationary reference frame voltages $v_b$, $v_c$ for the remaining phase coils B, C are implemented whilst the motor 10 is in the constant mode of operation.

Where the measured phase coil current $i_a$ of the selected phase coil A is greater than the phase coil currents $i_b$, $i_c$ of the remaining phase coils B, C, i.e., $i_a > i_b$, $i_c$, then the values of the multi-phase stationary reference frame voltages $v_b$, $v_c$ for the remaining phase coils B, C are increased by one or more predetermined increments until the phase coil currents $i_b$, $i_c$ of the remaining phase coils B, C fall with the predetermined range with respect to the phase coil current $i_a$ of the selected phase coil A.

Where the measured phase coil current $i_a$ of the selected phase coil A is less than the phase coil currents $i_b$, $i_c$ of the remaining phase coils B, C, i.e., $i_a < i_b$, $i_c$, then the values of the multi-phase stationary reference frame voltages $v_b$, $v_c$ for the remaining phase coils B, C are decreased by one or more predetermined increments until the phase coil currents $i_b$, $i_c$ of the remaining phase coils B, C fall with the predetermined range with respect to the phase coil current $i_a$ of the selected phase coil A. In some embodiments, a combination of increases and decreases of the values of the multi-phase stationary reference frame voltages $v_b$, $v_c$ for the remaining phase coils B, C may be required.

The method may be terminated once the phase coil currents $i_b$, $i_c$ of the remaining phase coils B, C fall with the predetermined range with respect to the phase coil current $i_a$ of the selected phase coil A and the motor continue to be controlled under normal FOC mode of operation.

Preferably, however, the steps of measuring the phase coil currents $i_a$, $i_b$, $i_c$ and adjusting the values of the multi-phase stationary reference frame voltages $v_b$, $v_c$ for the remaining phase coils B, C are implemented for each phase coil A, B, C in turn, each such phase coil A, B, C being nominated the selected phase coil on its turn.

In the method of the invention, a determination that the motor 10 has reached its constant mode of operation may be based on one or both of the two-axis rotating reference frame currents $I_q$, $I_d$. This is illustrated by FIG. 15 where the two-axis rotating reference frame current $I_q$ has reached a constant value because for steady state motor operating conditions, $I_q$, $I_d$ are each constant.

Once the measured phase coil currents $i_b$, $i_c$ of the remaining phase coils B, C equals the phase coil current $i_a$ of the selected phase coil A or once the phase coil currents $i_b$, $i_c$ of the remaining phase coils B, C fall with the predetermined range with respect to the phase coil current $i_a$ of the selected phase coil A, the phase coil current $i_a$ of the selected phase coil A and the resultant adjusted phase coil currents $i_b$, $i_c$ of the remaining phase coils B, C are used to generate adjusted multi-phase stationary reference frame voltages $v_a$, $v_b$, $v_c$ for the plurality of phase coils A, B, C. The adjusted multi-phase stationary reference frame voltages $v_a$, $v_b$, $v_c$ for the plurality of phase coils A, B, C are used to generated modified pulse modulated control (PWM) signals for driving the motor 10. The modified pulse modulated control (PWM) signals can be used to drive the motor 10 in an FOC mode of operation.

Figure 17:
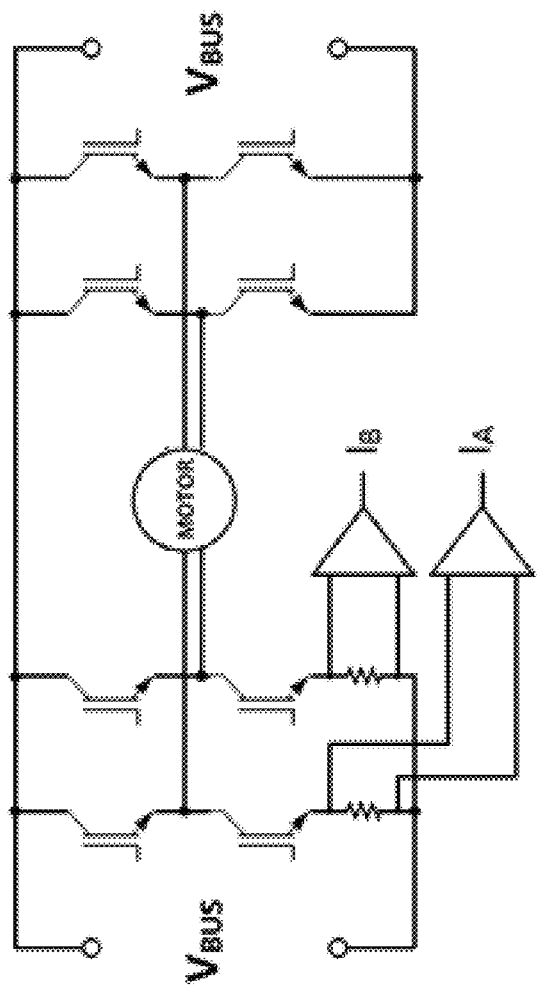
FIG. 17 is a schematic block diagram of a full-bridge inverter circuit for the motor motor control system in accordance with the invention for the multi-phase separated windings motor of FIG. 16.
Figure 16:
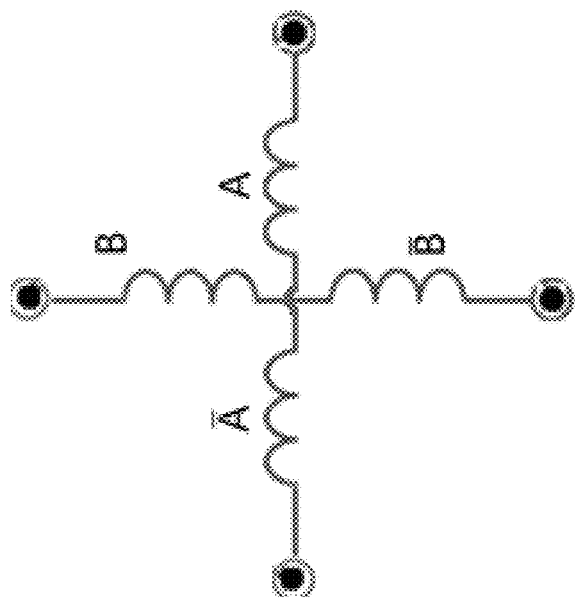
FIG. 16 is a schematic diagram showing a four-wire configuration of phase coil windings of a multi-phase separated windings motor in which the motor operating method in accordance with the invention can be implemented.

FIG. 16 provides a schematic diagram showing a four-wire configuration of 2-phase stator coil windings of the synchronous motor in which the motor operating method in accordance with the invention can be implemented. FIG. 17 provides a schematic block diagram of a full-bridge inverter circuit power stage for the motor controller 100/200 in which the sensed currents $i_a$ and $i_b$ ("$I_A$" and "$I_B$") are fed into the Park Transform module and the Position and Speed Estimator module 140/150.

Preferably, the plurality of phase coil windings for embodiments of the invention comprise at least two phase coil windings, or three phase coil windings, or phase coil windings in a number being a multiple of two or three.

The present invention also provides a non-transitory computer-readable medium storing machine-readable instructions, wherein, when the machine-readable instructions are executed by the processor of the closed-loop controller for the synchronous motor, they configure the processor to implement the concepts of the present invention.

In the foregoing description, it is assumed that the method of the invention is applied to permanent magnet rotor motors in which the motor control voltages comprise sine waves or near sine waves. However, the method of the invention can be implemented in trapezoidal motors without modification of the motor controller 100/200. In a trapezoidal motor, the current through the motor windings is switched off and on in a stepwise manner, resulting in a trapezoidal shape of the current waveform. The difference between a trapezoidal motor and a sinusoidal motor is that, in the trapezoidal motor, the current and voltage waveforms can be considered as being stepwise, less natural equivalents to the smoother sinusoidal waveforms in the sinusoidal motor. As such, the method of the invention can be applied to trapezoidal motors without modification of the method steps, although the motor controller 100/200 can be made from less complex and expensive electronic components.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine-readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of driving a multi-phase permanent magnet rotor motor having a plurality of phase coils, the method comprising the steps of:
    outputting pulse modulated control signals to the respective phase coils to bring the motor to a constant mode of operation;
    measuring phase coil currents; and
    based on a selected phase coil, adjusting values of multi-phase stationary reference frame voltages comprising said pulse modulated control signals for remaining phase coils not including said selected phase coil until the phase coil currents of the remaining phase coils equals the phase coil current of the selected phase coil or until the phase coil currents of the remaining phase coils fall with a predetermined range with respect to the phase coil current of the selected phase coil,
    wherein the steps of measuring the phase coil currents and adjusting the values of the multi-phase stationary reference frame voltages are implemented whilst the motor is in the constant mode of operation.

2. The method of claim 1, wherein the step of adjusting the values of the multi-phase stationary reference frame voltages comprising said pulse modulated control signals comprises adjusting the values of the multi-phase stationary reference frame voltages for only the remaining phase coils by one or more predetermined increments until the phase coil currents of the remaining phase coils equals the phase coil current of the selected phase coil or until the phase coil currents of the remaining phase coils fall with a predetermined range with respect to the phase coil current of the selected phase coil.

3. The method of claim 2, wherein the values of the multi-phase stationary reference frame voltages for the selected phase coil are maintained at the same values.

4. The method of claim 2, wherein the method includes, after adjusting the values of the multi-phase stationary reference frame voltages for only the remaining phase coils by each predetermined increment, measuring and comparing the phase coil currents to determine if the phase coil currents of the remaining phase coils equals the phase coil current of the selected phase coil or if the phase coil currents of the remaining phase coils fall with a predetermined range with respect to the phase coil current of the selected phase coil.

5. The method of claim 1, wherein the step of measuring the phase coil currents for adjusting the values of the multi-phase stationary reference frame voltages is implemented at a predetermined time period after the motor has been driven to the constant mode of operation.

6. The method of claim 1, wherein the method includes maintaining a constant load on the motor during the steps of measuring the phase coil currents and adjusting the values of the multi-phase stationary reference frame voltages for the remaining phase coils.

7. The method of claim 1, wherein, if the measured phase coil current of the selected phase coil is greater than the phase coil currents of the remaining phase coils, then increase the values of the multi-phase stationary reference frame voltages for the remaining phase coils by one or more predetermined increments.

8. The method of claim 1, wherein, if the measured phase coil current of the selected phase coil is less than the phase coil currents of the remaining phase coils, then decrease the values of the multi-phase stationary reference frame voltages for the remaining phase coils by one or more predetermined increments.

9. The method of claim 1, wherein the steps of measuring the phase coil currents and adjusting the values of the multi-phase stationary reference frame voltages for the remaining phase coils are implemented for each phase coil in turn, each such phase coil being nominated the selected phase coil.

10. The method of claim 1, wherein a determination of when the motor has been brought to the constant mode of operation is based on a two-axis rotating reference frame current.

11. The method of claim 10, wherein the determination of when the motor has been brought to the constant mode of operation is based on values of one or both of the two-axis rotating reference frame currents $I_d$, $I_q$.

12. The method of claim 1, wherein the phase coil current of the selected phase coil and resultant adjusted phase coil currents of the remaining phase coils are used to generate adjusted multi-phase stationary reference frame voltages for the plurality of phase coils.

13. The method of claim 12, wherein the adjusted multi-phase stationary reference frame voltages for the plurality of phase coils are used to generate modified pulse modulated control signals for driving the motor.

14. The method of claim 13, wherein the modified pulse modulated control signals for driving the motor are used to drive the motor in a field-oriented control (FOC) mode of operation.

15. A multi-phase permanent magnet rotor motor comprising:
a plurality three phase coil windings; and
a controller, said controller configured to:
output pulse modulated control signals to the respective phase coils to bring the motor to a constant mode of operation;
measure phase coil currents; and
based on a selected phase coil, adjust values of multi-phase stationary reference frame voltages comprising said pulse modulated control signals for remaining phase coils not including said selected phase coil until the phase coil currents of the remaining phase coils equals the phase coil current of the selected phase coil or until the phase coil currents of the remaining phase coils fall with a predetermined range with respect to the phase coil current of the selected phase coil,
wherein the controller is configured to measure the phase coil currents and adjust the values of the multi-phase stationary reference frame voltages whilst the motor is in the constant mode of operation.

16. A controller for a multi-phase permanent magnet rotor motor having a plurality three phase coil windings, the controller configured to:
output pulse modulated control signals to the respective phase coils to bring the motor to a constant mode of operation;
measure phase coil currents; and
based on a selected phase coil, adjust values of multi-phase stationary reference frame voltages comprising said pulse modulated control signals for remaining phase coils not including said selected phase coil until the phase coil currents of the remaining phase coils equals the phase coil current of the selected phase coil or until the phase coil currents of the remaining phase coils fall with a predetermined range with respect to the phase coil current of the selected phase coil;
wherein the controller is configured to measure the phase coil currents and adjust the values of the multi-phase stationary reference frame voltages whilst the motor is in the constant mode of operation.

17. A multi-phase permanent magnet rotor motor comprising:
a plurality three phase coil windings; and
a controller, said controller configured to:
output pulse modulated control signals to the respective phase coils to bring the motor to a constant mode of operation;
measure phase coil currents; and
based on a selected phase coil, adjust values of multi-phase stationary reference frame voltages comprising said pulse modulated control signals for remaining phase coils not including said selected phase coil until the phase coil currents of the remaining phase coils equals the phase coil current of the selected phase coil or until the phase coil currents of the remaining phase coils fall with a predetermined range with respect to the phase coil current of the selected phase coil;
wherein, if the measured phase coil current of the selected phase coil is greater than the phase coil currents of the remaining phase coils, the controller is configured to increase the values of the multi-phase stationary reference frame voltages for the remaining phase coils by one or more predetermined increments; or
if the measured phase coil current of the selected phase coil is less than the phase coil currents of the remaining phase coils, the controller is configured to decrease the values of the multi-phase stationary reference frame voltages for the remaining phase coils by one or more predetermined increments.

18. A multi-phase permanent magnet rotor motor comprising:
a plurality three phase coil windings; and
a controller, said controller configured to:
output pulse modulated control signals to the respective phase coils to bring the motor to a constant mode of operation;
measure phase coil currents; and
based on a selected phase coil, adjust values of multi-phase stationary reference frame voltages comprising said pulse modulated control signals for remaining phase coils not including said selected phase coil until the phase coil currents of the remaining phase coils equals the phase coil current of the selected phase coil or until the phase coil currents of the remaining phase coils fall with a predetermined range with respect to the phase coil current of the selected phase coil,
wherein the controller is configured to measure the phase coil currents and adjust the values of the multi-phase stationary reference frame voltages for the remaining phase coils for each phase coil in turn, each such phase coil being nominated the selected phase coil.

* * * * *